United States Patent [19]

Kuhls et al.

[11] 4,112,211

[45] Sep. 5, 1978

[54] PROCESS FOR THE MANUFACTURE OF HOMO- AND COPOLYMERS OF TETRAFLUOROETHYLENE EMPLOYING AS THE REDUCING AGENT IN THE REDOX CATALYST AN AYODICARBOXYLIC ACID, SALT OF AYOCARBOXYLIC ACID, AZODICARBONAMIDE, OR MIXTURES THEREOF

[75] Inventors: Jürgen Kuhls, Burghausen, Salzach; Alfred Steininger; Herbert Fitz, both of Burgkirchen, Alz, Fed. Rep. of Germany

[73] Assignee: Hoechst Aktiengesellschaft, Frankfurt am Main, Fed. Rep. of Germany

[21] Appl. No.: 688,429

[22] Filed: May 20, 1976

[30] Foreign Application Priority Data

May 28, 1975 [DE] Fed. Rep. of Germany ....... 2523570

[51] Int. Cl.$^2$ ........................... C08F 4/04; C08F 4/40; C08F 14/18; C08F 114/18
[52] U.S. Cl. ...................................... 526/219; 526/88; 526/91; 526/78; 526/201; 526/217; 526/220; 526/255
[58] Field of Search ................. 526/219, 201, 91, 255, 526/220, 217

[56] References Cited

U.S. PATENT DOCUMENTS

| | | | |
|---|---|---|---|
| 2,613,203 | 10/1952 | Myers | 526/91 |
| 2,820,026 | 1/1958 | Passino et al. | 526/91 |
| 3,088,941 | 5/1903 | Uhland | 526/255 |
| 3,110,704 | 11/1963 | Halliwell | 526/91 |
| 3,142,665 | 7/1964 | Cardinal et al. | 526/255 |
| 3,193,543 | 7/1965 | Ragazzini et al. | 526/91 |
| 3,404,135 | 10/1968 | Tietz | 526/219 |
| 3,475,391 | 10/1969 | Coker | 526/91 |
| 3,939,134 | 2/1976 | Console et al. | 526/220 |

FOREIGN PATENT DOCUMENTS

651,315 3/1951 United Kingdom ..................... 526/219

*Primary Examiner*—Herbert J. Lilling
*Attorney, Agent, or Firm*—Connolly & Hutz

[57] ABSTRACT

Polymers on the basis of tetrafluoroethylene are produced in the presence of a redox system as catalyst consisting of a usual peroxidic compound as oxidizing component and a water-soluble nitrogen compound liberating in situ a diimine under the polymerization conditions. The polymers obtained can be processed, inter alia, into thick walled articles on a ram extruder or into large sintered block free from crack formation.

4 Claims, No Drawings

PROCESS FOR THE MANUFACTURE OF HOMO- AND COPOLYMERS OF TETRAFLUOROETHYLENE EMPLOYING AS THE REDUCING AGENT IN THE REDOX CATALYST AN AYODICARBOXYLIC ACID, SALT OF AYOCARBOXYLIC ACID, AZODICARBONAMIDE, OR MIXTURES THEREOF

This invention relates to a process for homopolymerization of tetrafluoroethylene and for the copolymerization of tetrafluoroethylene with other fluoroolefins by the suspension or emulsion process in the presence of redox systems as catalyst.

It is known to polymerize fluoroolefins at elevated temperature with the aid of peroxidic compounds as catalysts. As peroxidic compounds there are used, for example, inorganic and organic peroxides or per-acids, persulfates, perborates, or percarbonates (cf. U.S. Pat. Nos. 2,230,654; 2,393,967; 2,513,312; 2,534,058). It has also been proposed to use azo-compounds carrying tertiary carbon atoms at both nitrogen atoms as catalysts for the polymerization of fluoroolefins (cf. U.S. Pat. Nos. 2,471,959; 2,510,783; 2,515,628; 2,520,338; 2,565,573 and 2,599,299). It is likewise known to polymerize fluoroolefins at low temperatures of about 0° to about 50° C. using redox systems as catalysts (cf. U.S. Pat. No. 2,393,967). The redox systems used consist of an oxidizing component in the form of one of the aforesaid peroxidic compounds and of a reducing agent, for example a bisulfite, thiosulfate, dithionite, hydrogen sulfite, sulfinate, or, for example, trimethylamine. To facilitate the decomposition of the oxidizing component heavy metal ions may be added in the form of heavy metal salts, for example, salts of monovalent silver, bivalent iron or copper, or trivalent chromium.

It has also been proposed to carry out the polymerization of tetrafluoroethylene at relatively low pressure in the range of from 0.5 to 3 atmospheres gage and at a temperature of from about 0 to about 50° C. in the presence of oxygen acids of elements of subgroup VII of the Periodic Table, especially the salts of permanganic acid, in an aqueous weakly acid medium (cf. U.S. Pat. No. 3,632,847).

Fluoroolefins, especially tetrafluoroethylene, are polymerized by two substantially different processes. On the one hand, by suspension polymerization whereby relatively coarse grained powders having a diameter in the range of from 200 to 1,000 $\mu$ are obtained. In this type of polymerization very small amounts of emulsifier may be present to improve the particle morphology (cf. German Pat. No. 1,109,370) and in most cases a precipitating agent is also added. On the other hand, fluoroolefin polymers are obtained by emulsion polymerization in the presence of larger amounts of emulsifier whereby colloidal dispersions are obtained with particles having a size in the range of from 0.05 to 0.8 $\mu$. Under the action of coagulating agents solid powders can be precipitated in the dispersions obtained and dried.

Suspension polymers are coarse powders with hard grain. They are processed, for example, by the so-called molding-sintering process or by ram extrusion, into large and thick-walled shaped structures. Dispersion polymers can be used in the form of the dispersions for coating or impregnation. Coagulated products, especially those obtained by polymerization with a seedy polymer, are suitable, owing to the snow ball like structure with large surface of the particles, for so-called paste-extrusion in which the coagulated material is made into a paste with a suitable lubricant and shaped into thin-walled structures, such as thin strands, thin-walled flexible tubes and pipes, by extrusion with nozzles of small cross section. Owing to the low molecular weight and the high specific standard density (SSG) and the resulting tendency to form cracks, the known dispersion polymers have been hardly suitable, up to now, for molding-sintering or ram extrusion.

In the processing of suspension polymers efforts are made nowadays to produce thick-walled structures by ram extrusion or large sintered blocks. The latter are especially important to an economic manufacture of sliced sheet. With increasing dimensions of the sintered blocks, the tendency to crack formation augments simultaneously so that the block or at least part of it becomes useless for further processing.

It is, therefore, desirable to develop a polymerization process according to which emulsion polymers can be obtained which are also suitable for molding-sintering and which do not have the detrimental tendency to form cracks.

It is the object of the present invention to provide a process for homopolymerizing tetrafluoroethylene and copolymerizing tetrafluoroethylene with other fluoroolefins by the suspension or emulsion process at the usual pressures and temperatures in the presence of a redox system as catalyst and optionally in the presence of emulsifiers, precipitating agents, buffer substances, traces of heavy metal salts, or anti-coagulants, which comprises using as catalyst a redox system consisting of one of the usual peroxidic oxidation components and a diimine as reducing agent, which diimine is set free in situ from a water-soluble nitrogen compound yielding a diimine under the polymerization conditions.

Suitable compounds from which a diimine can be set free under the polymerization conditions, i.e. under the action of water, an acid or preferably alkaline medium and at polymerization temperature are, for example, hydroxylamine-O-sulfonic acid $H_2N—O—SO_3H$ and the salts thereof $H_2N—O—SO_3Me$ (Me being a metal, preferably an alkali metal, more preferably Na, K, or also $NH_4$), and chloramine $H_2NCl$. There are preferred azo-dicarboxylic acid $HOOC—N{=}N—COOH$ and the salts thereof, preferably the alkali metal salts, especially the salts of K, Na and also $NH_4$; or azodicarbonamide $H_2NOC—N{=}N—CONH_2$.

As oxidation components of the redox system to be used according to the invention all known peroxidic compounds can be used, such as percarbonates, perborates, organic peroxides, organic per-acids and the salts thereof and at elevated temperatures possibly also $H_2O_2$ (as described, for example, in U.S. Pat. Nos. 2,230,654; 2,393,967; 2,513,312 and 2,534,058), persulfates and more especially the alkali metal and ammonium salts being preferred.

The oxidizing component of the redox system is preferably used in an amount of from $0.07 \times 10^{-3}$ to $9 \times 10^{-3}$, more especially $0.2 \times 10^{-3}$ to $3 \times 10^{-3}$ % by weight, calculated on the polymerization mixture and the water-soluble nitrogen compound liberating the diimine is used in an amount of from $0.1 \times 10^{-4}$ to $45 \times 10^{-4}$, especially $0.4 \times 10^{-4}$ to $15 \times 10^{-4}$ % by weight, likewise calculated on the polymerization mixture.

To facilitate decomposition traces of heavy metals may be added in a concentration of from $1 \times 10^{-5}$ to $4 \times 10^{-4}$ and preferably $3 \times 10^{-5}$ to $2 \times 10^{-4}$ % by weight, calculated on the total aqueous mixture, the metals being used in the form of salts of transition metals, for example, of copper, of bi- or trivalent iron, of trivalent chromium, or of mercury.

The process of the invention, carried out according to the suspension as well as the emulsion technique, is especially suitable for the homopolymerization of tetrafluoroethylene. It can also be used, however, for the copolymerization of tetrafluoroethylene with other fluoroolefinic compounds to yield polymers in which tetrafluoroethylene is the preponderant component present in a proportion of over 50 and preferably over 70 mol %. Suitable fluoroolefinic compounds are all olefins having one or two ethylenic double bonds in which at least one hydrogen atom, optionally all of them, are replaced by one or several fluorine atoms, and in which further hydrogen atoms can be replaced by chlorine or functional groups such as carboxyl, carboxyalkyl, or carboxyfluoroalkyl groups, or in which the chain may be interrupted by at least one ether oxygen bridge, cyclic fluoroolefins being included. There are mentioned as fluoroolefinic comonomers especially vinyl fluoride, vinylidene fluoride, perfluorocyclobutene and perfluoroalkenes having from 3 to 10 and preferably 3 to 5 carbon atoms. Especially preferred comonomers are perfluoro-(alkylvinyl) ethers of the formula $CF_2=CF-O-R_f$ in which $R_f$ represents a perfluoroalkyl radical having from 1 to 8 carbon atoms, preferably in a straight chain, especially the perfluoro-(methylvinyl), -(ethylvinyl), -(n-butylvinyl) and preferably -(propylvinyl) ethers; furthermore perfluorinated cyclic ethers of the formula

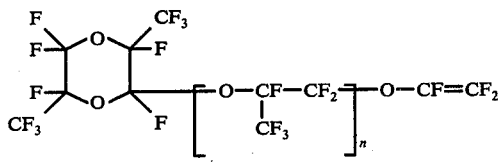

in which $n$ is zero to 4, preferably zero or 1, and more preferably zero, as well as chlorotrifluoroethylene and hexafluoropropylene.

The suspension as well as the emulsion polymerization can be carried out in a weakly acid or in an alkaline medium, a pH of from 7 to 10 and especially 7 to 9 being preferred. To adjust an alkaline pH, dilute alkalies can be added, preferably aqueous ammonia. According to their hydrolytic stability depending on the pH, the nitrogen compounds liberating a diimine to be used in the process of the invention, are dissolved in water or preferably in dilute alkalies, especially in aqueous ammonia, and the solution is fed to the autoclave in dosed quantities, preferably as last component.

The peroxidic compound, and optionally precipitating agents, emulsifiers and other additives are preferably added to the polymerization medium prior to polymerization. The emulsion polymerization is carried out in the presence of the usual known telogenically inactive emulsifiers, especially the salts of perfluoro-carboxylic acids, more preferably the alkali metal and ammonium salts thereof. Other perfluorinated emulsifiers may also be used, for example, salts of perfluorodicarboxylic acids, perfluorosulfonic acids, perfluorophosphonic acids, and analogous compounds in which the terminal fluorine atom is replaced by hydrogen or one or several fluorine atoms are replaced by chlorine. In the suspension polymerization the aforesaid emulsifiers may also be added, but their concentration should not exceed 30 ppm, preferably 20 ppm, calculated on the aqueous medium. Usual and known buffer substances may also be added, particularly ammonium salts, for example, ammonium carbaminate, ammonium carbonate, ammonium chloride, and precipitating agents normally used in suspension polymerization, for example, borax or inorganic water-soluble phosphates.

With the use of the redox catalysts according to the invention the suspension polymerization process yields freely flowing powdery polymers having an average particle diameter of from 200 to 1,000, preferably 200 to 700 $\mu$m. The pressures and temperatures at which the suspension polymerization is carried out are relatively low, for example, about 0.5 to 30, preferably 3 to 20 atmospheres gage and about 5 to 50, preferably 10° to 40° C.

By emulsion polymerization with the use of the normal amounts of known emulsifiers stable aqueous dispersions are obtained in which the polymer has an average particle diameter of from 0.05 to 0.8, preferably 0.1 to 0.5 $\mu$m. In this case, too, the pressures and temperatures required are relatively low, i.e. about 5 to 30, preferably 8 to 20 atmospheres gage and about 5 to 50, preferably 10° to 40° C.

With the use of the redox catalysts of the invention for the suspension polymerization the formation of wall deposits known from other systems is almost fully suppressed. This could be attributed to the high space-time-yield of polymer at the beginning of the polymerization. The powdery polymers obtained are preferably ground, first for some time in the wet state and then, after drying, for example, in helical jet mills or hammer mills, down to an average particle size of from 20 to 70 $\mu$m. Surprisingly, very thick-walled molded and sintered structures or ram-extruded objects can be produced which are free from cracks. It has been found that large sintered blocks having a weight of up to 80 kg can be used up to the core for making sliced sheets in which an optical test does not show any crack or fissure.

The emulsion polymerization with the use of the redox systems according to the invention takes place with a very high space-time-yield. To avoid the formation of coagulum covering layers with so-called white oils or paraffin waxes are necessary (cf. U.S. Pat. Nos. 3,142,665 and 2,612,482), or small amounts of anti-coagulants, for example, polyoxyalkylates, are added to obtain dispersions of high solids content. Such coating agents or anti-coagulants, as far as they contain hydrocarbon groups, have a regulating effect and reduce the average molecular weight or increase the specific standard density SSG (determined according to ASTM-D-1457-62 T). A comparison of the SSG values of emulsion polymers produced by the process of the invention with the values of a product prepared according to the state of the art (German Pat. No. 1,720,738) surprisingly shows that - in spite of the use of a polyoxalkylate as anti-coagulant - an increase in the standard density does not take place. The anti-coagulants named in U.S. Pat. No. 2,612,484 and German Pat. No. 1,720,738 can be used with advantage also in the process of the invention (emulsion polymerization). Besides the specified polyoxalkylates there can also be used higher glycols such as diethylene, triethylene, dipropylene, and tripropylene glycol and higher homologs thereof as well as mixed glycols of ethylene and propylene oxide.

TABLE 1

Comparative determination of standard density, tendency to crack formation and specific surface of emulsion polymers

| emulsion polymer of | anti-coagulant | SSG g/cm³ | crack formation in 1 kg sintered block | BET value +) cm²/g |
|---|---|---|---|---|
| German Pat. 1,720,738 Example 3 | polypropylene oxide-polyglycol ether (12.6) | 2.185 | many cracks | 10 |
| Example 14 (Table 3) of invention | " | 2.155 | without cracks | 9.8 |

+)determination of the specific inner surface according to Brunauer, Emmet and Teller J. Am. Chem. Soc., 60, 1938, page 309.

With the use of the redox catalyst system according to the invention it is surprisingly possible to produce also by the emulsion polymerization process polymers, especially homopolymers of tetrafluoroethylene, in a molecular weight range as generally obtained exclusively by suspension polymerization, i.e. an SSG<2.17 g/cm³ (usual dispersion polymers have an SSG of <2.17 up to 2.24 g/cm³). The table further shows that the high specific inner surface is maintained (BET value). After coagulation and drying in known manner the emulsion polymers obtained can be processed also by molding-sintering and ram extrusion technics, which is absolutely unusual for emulsion polymers. Sintered blocks having a weight of up to 1 kg can be produced which are absolutely free from cracks. For molding-sintering and ram extrusion technics freely flowing products can be produced by simple mechanical coagulation of the dispersion with subsequent drying without grinding or another commonly used after-treatment of the powdery coagulum being necessary. When the said polymers are produced by suspension polymerization grinding is indispensible and when automatic feeding apparatus is used, it is also necessary to improve the flow properties and the apparent density of the powders by special treatment in the wet or dry state, for example, by a granulation in water or organic liquids or a system consisting of water and organic liquids. When the emulsion polymers of the invention produced by emulsion polymerization are processed in a ram extruder they are suitably dried at elevated temperature in the range of from 200° to 300° C., at which sintering sets in. Owing to the low hardness of the powders extrudates with especially smooth surfaces are obtained.

The emulsion polymerization with the redox system according to the invention can also be carried out with the use of a seed dispersion (for example as described in U.S. Pat. No. 3,088,941 or German Pat. No. 1,795,078) of polytetrafluoroethylene or of copolymers of tetrafluoroethylene with other fluoroolefins, especially with chlorotrifluoroethylene.

Owing to their high molecular weight the pastes obtained have a higher melt viscosity preventing for certain purposes, for example, when nonsintered bands are produced, a flowing together of the pores above the sintering point of the polytetrafluoroethylene so that the maintenance of the paste structure is ensured. This is of importance to the manufacture of porous diaphragms. The dispersions obtained can also be used for particularly stable impregnations of asbestos and other substances.

The following examples illustrate the invention.

A. Suspension polymerization (Examples 1 to 12, Table 2)

a. Polymerization:

The polymerization autoclave used had a capacity of 180 l and an enamel inside lining and was provided with a baffle. It was charged with 90 l of desalted water and the additives specified in column 2 of Table 2. The stirrer was switched on at a speed of 100 revolutions per minute, the autoclave was flushed 15 times with nitrogen and two times with tetrafluoroethylene (2 atmospheres gage) and tetrafluoroethylene was forced in up to the desired pressure (as indicated in Table 2). After increase of the stirrer speed to 180 revolutions per minute, additional quantities of the additives indicated in column 2 were metered in and it was rinsed with 900 cc of water. Polymerization was continued under the conditions set forth in Table 2 to the solids content indicated.

b. Processing:

After pressure release the autoclave was flushed three times with nitrogen (4 to 5 atmospheres gage) while stirring and the polymerization medium was discharged. In the autoclave the polymer was washed 3 times, each time for 5 minutes with 100 liters of water while stirring at 110 revolutions per minute. About ⅓ of the polymer was then ground two times, with intermediate water exchange, in a glass vessel for 10 minutes together with 50 liters of water to an average particle diameter of 200 to 400 μm. Wash water in excess was removed by passing the mixture through a straining bowl and the polymer was dried in a layer of from 5 to 7 cm for 6 hours at 240° C. in a drying cabinet with air circulation. The product obtained was ground in a helical jet mill or a hammer mill to an average particle diameter of 20 to 70 μm.

B. Emulsion polymerization (Examples 13 to 20, Table 3)

a. Polymerization:

The autoclave used was the same as in the suspension polymerization. In all examples the polymerization medium first introduced consisted of 80 liters of water (reduced by the amount charged with the seed dispersion, if any)

96 cc of NH₃ (18% by weight aqueous solution in water)

8 cc of CuSO₄ (2% by weight solution in water)

1.4 g of diethylene glycol 10.6 g of ammonium carbaminate 70 g of ammonium perfluorooctanate After having adjusted the stirrer to a speed of 80 revolutions per minute, the autoclave was flushed about 15 times with nitrogen and then 2 times with tetrafluoroethylene and then tetrafluoroethylene was forced in up to the desired pressure as indicated in Table 3. The stirrer speed was increased to 120 revolutions per minute and, when the polymerization pressure was reached, the additives specified in column 3 of Table 3 were metered in. Polymerization was effected at the pressures and temperatures indicated in Table 3 until the solids contents in % by weight, calculated on the total mixture, were obtained.

b. Processing:

In an enamelled 600 liter vessel provided with MIG stirrer (with 4 propellers with 4 blades each distributed over the shaft with staggered position of the blades) and baffle the dispersion obtained was diluted by adding water to a solids content of 10% by weight, calculated on the polymerization mixture, and the mixture was stirred at a temperature of 22 to 25° C. After washing twice with 150 liters each of water the powder was dried under the conditions indicated in the second to last column of Table 3.

Referring to Tables 2 and 3

All percentages are by weight and relate to aqueous solutions.

$CH_6N_2O_2$ = ammonium carbaminate
$N_2(COONa)_2$ = sodium salt of azodicarboxylic acid
$N_2(CONH_2)$ = azodicarbonamide +) To determine the SSG values (ASTM-D-1457-62-T) the crude polymer was ground to an average particle diameter of from 50 to 100 μm in the wet state in an Ultra-Turrax and dried at 200° C.

Table 2

| Ex. No. | introduced with aqueous medium | | metered in after having reached polymerization pressure | | temp. ° C | atm. gage | solids content % by weight | SSG +) density g/cm³ |
|---|---|---|---|---|---|---|---|---|
| 1 | $CF_3—(CF_2)_6—COONH_4$<br>$NH_3$ 18%<br>$CuSO_4$ 2%<br>$CH_6N_2O_2$ | (270 mg)<br>( 30 cm³)<br>( 2 cm³)<br>(7.8 g ) | $(NH_4)_2S_2O_8$<br>$NH_3$ 12%<br>$N_2(CooNa)_2$<br>$CuSO_4$ 2% | (1160 mg)<br>( 65 cm³)<br>( 835 mg)<br>( 2 cm³) | 25 | 6 | 23 | 2.141 |
| 2 | $CF_3—(CF_2)_6—COONH_4$<br>$NH_3$ 18%<br>$CuSO_4$ 2%<br>$CH_6N_2O_2$ | (420 mg)<br>( 30 cm³)<br>( 2 cm³)<br>(7.8 g ) | $(NH_4)_2S_2O_8$<br>$NH_3$ 9%<br>$N_2(CONH_2)_2$<br>in 10% NaOH<br>$CuSO_4$ 2% | (1160 mg)<br>( 60 cm³)<br>( 500 mg)<br>( 6 cm³)<br>( 2 cm³) | 34 | 4 | 20 | 2.142 |
| 3 | $CF_3—(CF_2)_8—COONH_4$<br>$NH_3$ 18%<br>$CuSO_4$ 2%<br>$CH_6N_2O_2$ | (270 mg)<br>( 30 cm³)<br>( 2 cm³)<br>( 7.8 g ) | $(NH_4)_2S_2O_8$<br>$NH_3$ 9%<br>$N_2(CONH_2)_2$<br>in 10% NaOH<br>$CuSO_4$ 2% | ( 580 mg)<br>( 60 cm³)<br>( 250 mg)<br>( 6 cm³)<br>( 2 cm³) | 25 | 6 | 19 | 2.145 |
| 4 | $CF_3(CF_2)_6—COONH_4$<br>$NH_3$ 18%<br>$CuSO_4$ 2%<br>$CH_6N_2O_2$ | ( 270 mg)<br>( 30 cm³)<br>( 2 cm³)<br>( 7.8 g ) | $(NH_4)_2S_2O_8$<br>$NH_3$ 9%<br>$N_2(CONH_2)_2$<br>in 10% NaOH<br>$CuSO_4$ 2% | ( 290 mg)<br>( 60 cm³)<br>( 125 mg)<br>( 6 cm³)<br>( 2 cm³) | 24 | 8 | 22 | 2.147 |
| 5 | $NH_3$ 18%<br>$CuSO_4$ 2%<br>$CH_3N_2O_2$ | ( 30 cm³)<br>( 2 cm³)<br>( 7.8 g ) | $(NH_4)_2S_2O_8$<br>$NH_3$ 9%<br>$N_2(CONH_2)_2$<br>in 10% NaOH<br>$CuSO_4$ 2% | ( 580 mg)<br>( 60 cm³)<br>( 250 mg)<br>( 6 cm³)<br>( 2 cm³) | 15 | 7 | 21 | 2.142 |
| 6 | $NH_3$ 18%<br>$CuSO_4$ 2%<br>$(NH_4)_2CO_3$ | ( 30 cm³)<br>( 2 cm³)<br>( 7.8 g ) | $(NH_4)_2S_2O_8$<br>$NH_3$ 9%<br>$N_2(CONH_2)_2$<br>in 10% NaOH<br>$CuSO_4$ 2% | ( 290 mg)<br>( 60 cm³)<br>( 80 mg)<br>( 6 cm³)<br>( 2 cm³) | 16 | 8 | 20 | 2.148 |
| 7 | $NH_3$ 18%<br>$CuSO_4$ 2%<br>$(NH_4)_2CO_3$ | ( 30 cm³)<br>( 2 cm³)<br>( 7.8 g ) | same as Ex. 2 | | 10 | 8 | 19 | 2.144 |
| 8 | $NH_3$ 18%<br>$CuSO_4$ 2%<br>$Na_2B_4O_7 \cdot 12H_2O$ | ( 5.8 cm³)<br>( 4 cm³)<br>( 290 g ) | $(NH_4)_2S_2O_8$<br>$NH_3$ 9%<br>$N_2(CONH_2)_2$<br>in 10% NaOH | (1160 mg)<br>( 90 cm³)<br>( 500 mg)<br>( 6 cm³) | 25 | 9 | 20 | 2.142 |
| 9 | $NH_4Cl$<br>$CuSO_4$ 2%<br>$(NH_4)_2CO_3$ | ( 15 g )<br>( 2 cm³)<br>( 7.8 g ) | same as Ex. 2 | | 32 | 6 | 20 | 2.145 |
| 10 | $NH_3$ 18%<br>$HgNO_3$ 2%<br>$(NH_4)_2CO_3$ | ( 30 cm³)<br>( 6 cm³)<br>( 7.8 g ) | $(NH_4)_2S_2O_8$<br>$NH_3$ 12%<br>$N_2(CONH_2)_2$<br>$AgNO_3$ 2% | ( 580 mg)<br>( 65 cm³)<br>( 250 mg)<br>( 2 cm³) | 15 | 7 | 17 | 2.143 |
| 11 | $NH_3$ 18%<br>$CH_6N_2O_2$ | ( 30 cm³)<br>( 7.8 g ) | $H_2O_2$ 25% | ( 6 cm³) | 45 | 10 | 17 | 2.145 |
| 12 | $NH_3$ 18%<br>$CuSO_4$ 2% | ( 30 cm³)<br>( 2 cm³) | $(NH_4)_2S_2O_8$<br>$NH_2—O—SO_3H$<br>$CuSO_4$ 2% | (1160 mg)<br>( 963 mg)<br>( 2 cm³) | 28 | 11 | 19 | 2.139 |

Table 3

| Ex. No. | introduced with aqueous medium | metered in after having reached polymerization pressure | | temp. ° C | atm. gage | solids content wt % | drying temp. ° C | hrs. | SSG +) density g/cc |
|---|---|---|---|---|---|---|---|---|---|
| 13 | seed dispersion of 96.5% TFE/3.5% $CF_2=CFCl$ 10 wt.% (14.4 kg) | $(NH_4)_2S_2O_8$<br>$NH_3$ 4.5%<br>$N_2(CONH_2)_2$ | ( 520 mg)<br>( 160 cm³)<br>( 200 mg) | 32 | 14 | 22 | 105 | 20 | 2.164 |
| 14 | — | $(NH_4)_2S_2O_8$<br>$NH_3$ 4.5%<br>$N_2(CONH_2)_2$ | ( 520 mg)<br>( 160 cm³)<br>( 200 mg) | 31 | 16 | 18 | a) 105<br>b) 200<br>c) 300<br>d) 350 | 20<br>20<br>20<br>6 | 2.155 |
| 15 | — | $(NH_4)_2S_2O_8$<br>$NH_3$ 24%<br>$N_2(CONH_2)_2$ | (1160 mg)<br>( 10 cm³)<br>( 200 mg) | 28 | 10 | 20 | used as dispersion | | |
| 16 | — | $(NH_4)_2S_2O_8$<br>$NH_2—O—SO_3H$ | (1160 mg)<br>( 963 mg) | 28 | 14 | 20 | used as dispersion | | |
| 17 | — | $(NH_4)_2S_2O_8$ | (1160 mg) | 34 | 14 | 20 | used as dispersion | | |

Table 3-continued

| Ex. No. | introduced with aqueous medium | Emulsion polymerization metered in after having reached polymerization pressure | | temp. °C | atm. gage | solids content wt % | drying temp. °C | hrs. | SSG +) density g/cc |
|---|---|---|---|---|---|---|---|---|---|
| 18 | $CF_2$=CFCl (360 g) | $NH_3$ 24%<br>$N_2(COONa)_2$<br>$(NH_4)_2S_2O_8$ | ( 15 cm³)<br>( 835 mg)<br>(1160 mg) | 36 | 14 | 10 | used as dispersion | | |
| 19 | $CF_2$=CFCl (360 g) | $NH_3$ 24%<br>$N_2(COONa)_2$<br>$(NH_4)_2S_2O_8$ | ( 15 cm³)<br>( 835 mg)<br>(1160 mg) | 37 | 14 | 11 | used as dispersion | | |
| 20 | seed dispersion of PTFE 10 wt. % (14.4 kg) | $N_2(CONH_2)_2$ in 10 % . NaOH<br>$(NH_4)_2S_2O_8$<br>$NH_3$ 4,5 %<br>$NH_2(CONH_2)_2$ | ( 500mg)<br>( 6 cm³)<br>( 520 mg)<br>(160 cm³)<br>( 200 mg) | 14 | 18 | 20 | 200 | 20 | 2.159 |

What is claimed is:

1. In the process for homopolymerizing tetrafluoroethylene or copolymerizing tetrafluoroethylene with other fluoroolefins by the suspension or emulsion process at the usual pressures and temperatures, in the presence of a redox catalyst system consisting of a known peroxidic oxidizing component and a reducing component, the improvement which comprises using as reducing component of the redox system a member selected from the group consisting of azodicarboxylic acid, a salt of azodicarboxylic acid, azodicarbonamide, and mixtures thereof.

2. The process as claimed in claim 1, wherein the polymerization is carried out in an alkaline medium at a pH of from 7 to 10.

3. The process as claimed in claim 1, wherein the peroxidic oxidizing component of the redox system is added in an amount of from $0.07 \times 10^{-3}$ to $9 \times 10^{-3}\%$ by weight, calculated on the polymerization mixture, and the reducing component of the redox system is added in an amount of from $0.1 \times 10^{-4}$ to $45 \times 10^{-4}\%$ by weight, calculated on the polymerization mixture.

4. The process as claimed in claim 1, wherein the polymerization by the emulsion process is carried out in the presence of a seed dispersion containing a homopolymer of tetrafluoroethylene or a copolymer of tetrafluoroethylene with other fluoroolefins.

* * * * *